(12) United States Patent
Yamada

(10) Patent No.: US 11,526,416 B2
(45) Date of Patent: Dec. 13, 2022

(54) PERFORMANCE IMPACT EVALUATION DEVICE AND PERFORMANCE IMPACT EVALUATION METHOD

(71) Applicant: Nippon Telegraph and Telephone Corporation, Tokyo (JP)

(72) Inventor: Takeshi Yamada, Tokyo (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 176 days.

(21) Appl. No.: 16/980,899

(22) PCT Filed: Mar. 20, 2019

(86) PCT No.: PCT/JP2019/011812
§ 371 (c)(1),
(2) Date: Sep. 15, 2020

(87) PCT Pub. No.: WO2019/188695
PCT Pub. Date: Oct. 3, 2019

(65) Prior Publication Data
US 2021/0026752 A1  Jan. 28, 2021

(30) Foreign Application Priority Data
Mar. 28, 2018 (JP) .............................. JP2018-061677

(51) Int. Cl.
*G06F 11/34* (2006.01)
*G06F 11/30* (2006.01)
(52) U.S. Cl.
CPC ...... *G06F 11/3409* (2013.01); *G06F 11/3089* (2013.01); *G06F 11/3476* (2013.01)

(58) Field of Classification Search
CPC ............ G06F 11/3409; G06F 11/3089; G06F 11/3476; G06F 11/3419
See application file for complete search history.

(56) References Cited

U.S. PATENT DOCUMENTS

2021/0208998 A1\* 7/2021 Yamada ................... G06F 8/70

FOREIGN PATENT DOCUMENTS

JP   06259478 A  \*  9/1994
JP   H 06259478       9/1994
(Continued)

OTHER PUBLICATIONS

Nakano et al., "Cobalt: A Method for Balancing Both Access Load and Utilization Ratio in a Parallel Distributed Storage System with Version Management," Japanese Journal of IEICE, 2007, 90(2):349-358, 24 pages (with English Translation).

(Continued)

*Primary Examiner* — Manuel L Barbee
(74) *Attorney, Agent, or Firm* — Fish & Richardson P.C.

(57) ABSTRACT

To provide a performance impact evaluation apparatus and a performance impact evaluation method in which it is possible to more accurately evaluate a performance impact caused by software data/process separation. A performance impact evaluation apparatus 1 evaluates a performance impact caused by separating data 2 used in software into an external DB 4. The performance impact evaluation apparatus 1 includes a log acquisition unit 21 configured to acquire a log for recording an access to the external DB 4 and an evaluation unit 22 configured to evaluate the performance impact by using an evaluation expression considering a software structure in addition to characteristics of the data 2, based on the log acquired by the log acquisition unit 21.

7 Claims, 8 Drawing Sheets

(56) References Cited

FOREIGN PATENT DOCUMENTS

| | | | |
|---|---|---|---|
| JP | 2006-185413 | | 7/2006 |
| JP | 2018-25860 | | 2/2018 |
| JP | 2018025860 A | * | 2/2018 |
| WO | WO 2013/047207 | | 4/2013 |

OTHER PUBLICATIONS

Yamada et al., "Investigation of Delay Evaluation Method for Development of Separation of Data from Communication Software Process—Evaluation method for delay in dividing process and data on network system," The Institute of Electronics, Information and Communication Engineers (IEICE), 2018, 118(123):85-86, 8 pages (with English Translation).

* cited by examiner

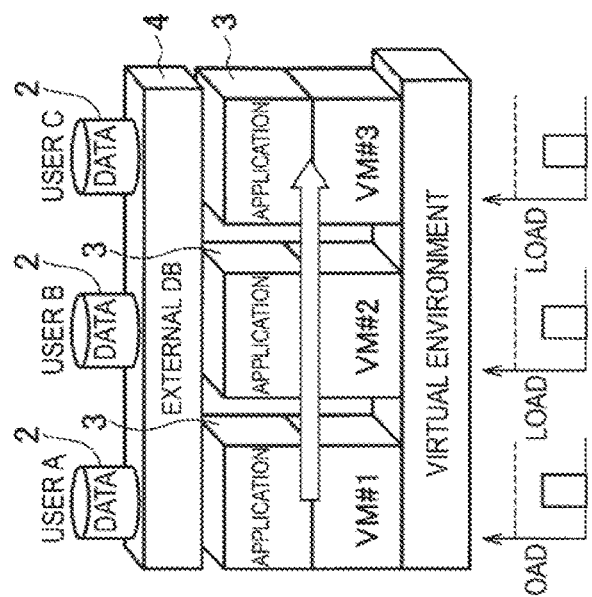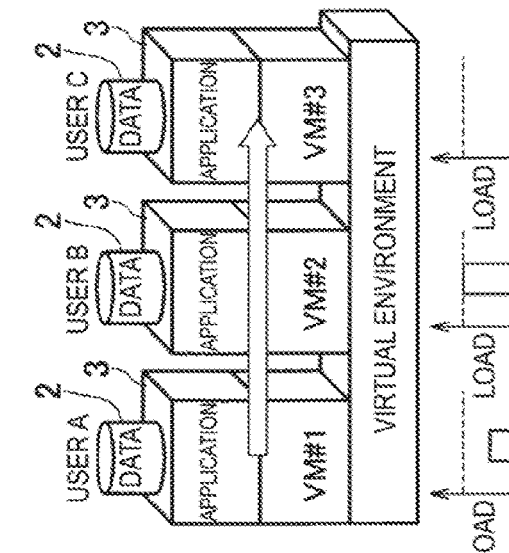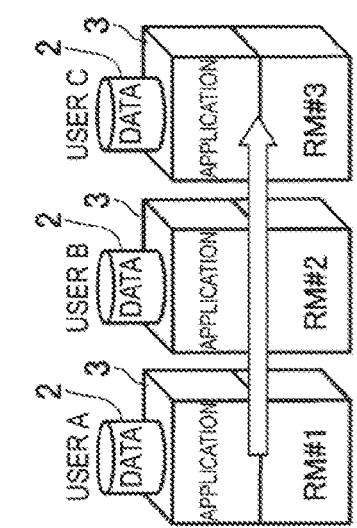

PERFORMANCE IMPACT EVALUATION DEVICE AND PERFORMANCE IMPACT EVALUATION METHOD

CROSS-REFERENCE TO RELATED APPLICATIONS

This application is a National Stage application under 35 U.S.C. § 371 of International Application No. PCT/JP2019/011812, having an International Filing Date of Mar. 20, 2019, which claims priority to Japanese Application Serial No. 2018-061677, filed on Mar. 28, 2018. The disclosure of the prior application is considered part of the disclosure of this application, and is incorporated in its entirety into this application.

TECHNICAL FIELD

The present disclosure relates to a performance impact evaluation apparatus and a performance impact evaluation method for evaluating a performance impact caused by software data/process separation.

BACKGROUND ART

As known in the art, migration to a cloud environment or the like has been widely performed in various fields in order to improve operational efficiency such as system scalability and efficiency in use of computer resources. A communication system that requires a large resource (CPU, memory) for a processing server has a similar tendency, but it is not possible to achieve advantages only by migrating the known communication system itself to a new execution environment.

In many known communication systems, each processing server has its own individuality, for example, each processing server individually defines the contents to be processed. If such individuality remains in a new execution environment, it is difficult to achieve the advantages such as operational efficiency and effective use of resources.

As one solution style, there is a method of separating data into an external DB, causing the data to be shared between processing servers, and removing the individuality of the processing server by excluding data providing individuality from the processing servers (for example, Patent Literature 1). It is thought that by making the processing server have no individuality, it is possible to position the processing servers more simply even in a cloud environment or the like, and possible to realize improvement of scalability or improvement of resource efficiency by efficient load balancing.

CITATION LIST

Patent Literature

Patent Literature 1: JP 2018-025860 A

SUMMARY OF THE INVENTION

Technical Problem

However, when migrating to a data separation type system, an access to an external DB is newly added. The access leads to an extension of call processing Turn Around Time (TAT), which affects performance or the like. Although an impact evaluation is required before development determination, it is difficult to perform performance assessment of an NTT or OSS software which has been developed over many years and has become complicated, before the development. Thus, it is necessary to solve the performance impact caused by the additional access to the external DB. Patent Literature 1 discloses a data separation evaluation apparatus that supports appropriate separation of data used in an application. However, it is desirable to evaluate the performance impact with more accuracy.

Considering the above-described known technology, an object of the present disclosure is to provide a performance impact evaluation apparatus and a performance impact evaluation method in which it is possible to more accurately evaluate a performance impact caused by software data/process separation.

Means for Solving the Problem

To achieve the object described above, according to a first aspect, a performance impact evaluation apparatus that evaluates a performance impact caused by separating data used in software into an external DB. The performance impact evaluation apparatus includes a log acquisition unit configured to acquire a log for recording an access to the external DB, and an evaluation unit configured to evaluate the performance impact by using an evaluation expression considering a software structure in addition to characteristics of data, based on the log acquired by the log acquisition unit.

According to a second aspect, in the first aspect, the evaluation unit evaluates the performance impact by using an evaluation expression that is different for a portion of the software structure that is a sequentially-processed structure and a portion of the software structure that is a parallel-processed structure.

According to a third aspect, in the second aspect, the evaluation unit evaluates the performance impact on the portion of the software structure that is the sequentially-processed structure by using an evaluation expression in which a delay impact is multiplied by a number of accesses.

According to a fourth aspect, in the third aspect, the evaluation unit evaluates the performance impact on the portion of the software structure that is the sequentially-processed structure by using the following evaluation expression.

$$\text{Performance Impact} \propto \text{Frequency[Times/Call]} \times \text{Traffic[Call/Sec]} \times \text{Size[Byte]} \times \text{Timer value[Sec]} \qquad \text{[Math 3]}$$

According to a fifth aspect, in the second aspect, the evaluation unit evaluates the performance impact on the portion of the software structure that is the parallel-processed structure by using an evaluation expression in which a delay impact is not accumulated.

According to a sixth aspect, in the fifth aspect, the evaluation unit evaluates the performance impact on the portion of the software structure, which is the parallel-processed structure, by using the following evaluation expression.

$$\text{Performance Impact} \propto \text{Frequency[Times/Call]} \times \text{Size[Byte]} \qquad \text{[Math 4]}$$

According to a seventh aspect, in any one of the first to sixth aspects, the evaluation unit evaluates the performance impact by using an evaluation expression in which a size has an impact by a number of accesses to the external DB.

According to an eighth aspect, a performance impact evaluation method for evaluating a performance impact caused by separating data used in software into an external DB includes, at a performance impact evaluation apparatus, acquiring a log for recording an access to the external DB, and evaluating the performance impact by using an evaluation expression considering a software structure in addition to characteristics of data, based on the log acquired in the acquiring.

Effects of the Invention

According to the present disclosure, it is possible to provide a performance impact evaluation apparatus and a performance impact evaluation method in which it is possible to more accurately evaluate a performance impact caused by software data/process separation.

BRIEF DESCRIPTION OF DRAWINGS

FIGS. 1A to 1C are conceptual diagrams illustrating a background technology.

DESCRIPTION OF EMBODIMENTS

Hereinafter, an embodiment of the present disclosure will be described with reference to the drawings. The same or similar components are denoted by the same or similar reference signs in description of the drawings.

Background

As described above, it is not possible to achieve advantages only by migrating the known communication system itself to a new execution environment. For example, as illustrated in FIGS. 1A and 1B, even though an execution environment is migrated to a virtual environment, if the individuality of each processing server (each application) 3 remains in the new execution environment, it is not possible to achieve any advantage in terms of load balancing and scalability. As illustrated in FIGS. 1B and 1C, if data 2 that creates individuality is shared (here, data is separated), and the processing server 3 is made not to be individual, it is possible to achieve advantages in terms of load balancing, scalability, or the like.

Figure 2:
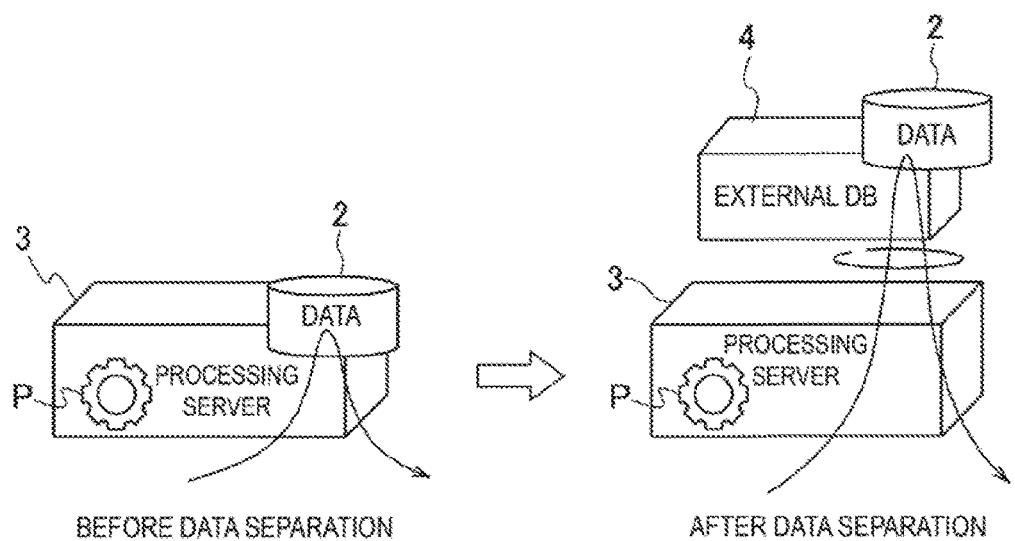
FIG. 2 is a conceptual diagram illustrating a problem of the background technology.

However, when migrating to a data separation type system as illustrated in FIGS. 1B and 1C, an access to an external DB 4 is newly added. Thus, as illustrated in FIG. 2, the access to the external DB 4 leads to an extension of call processing TAT, and there are problems such as "the performance after development is not known", "cost-effectiveness is not known", and "development determination is not possible". As a result, it is necessary to solve a performance impact caused by the addition of the access to the external DB 4.

Performance Impact Evaluation Apparatus

Figure 3:
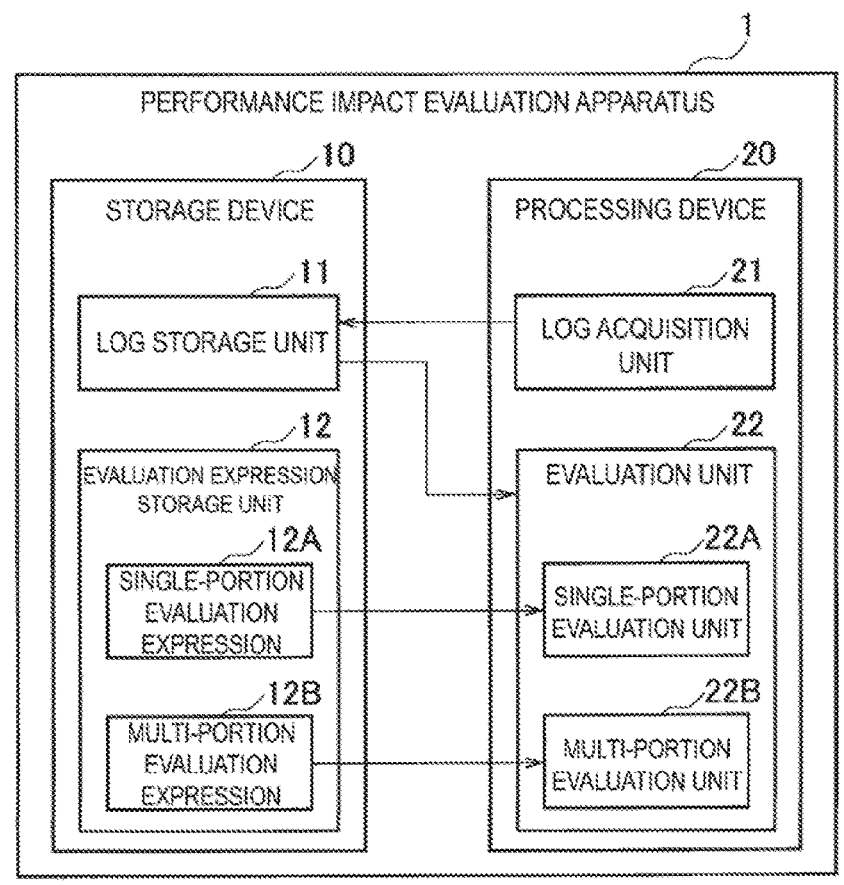
FIG. 3 is a functional block diagram illustrating a performance impact evaluation apparatus according to an embodiment of the present disclosure.

FIG. 3 is a functional block diagram illustrating a performance impact evaluation apparatus 1 according to an embodiment of the present disclosure. The performance impact evaluation apparatus 1 is an apparatus that evaluates a performance impact caused by software data/process separation. That is, a technology as follows is presumed. In this technology, biasing the processing of the processing server 3 is prevented in a manner that data 2 is separated into the external DB 4 and is shared between processing servers 3, the data 2 which affects the throughput is excluded from the processing server 3, and the individuality of the processing server 3 is removed. In evaluating the performance impact generated by such data/process separation, an evaluation expression that considers not only the characteristics of the data 2 but also the software structure is used.

A storage device 10 is a hard disk or the like that stores various types of data, and includes a log storage unit 11 and an evaluation expression storage unit 12. The log storage unit 11 stores a log acquired by a log acquisition unit 21. The evaluation expression storage unit 12 stores an evaluation expression used for evaluating a performance impact. A single-portion evaluation expression 12A is an evaluation expression used when a single portion is evaluated. A single portion means a portion which is sequentially processed in a software structure. A multi-portion evaluation expression 12B is an evaluation expression used when a multi-portion is evaluated. The multi-portion means a portion which is processed in parallel, in the software structure. In a case where evaluation is performed in consideration of characteristics of data 2, such an evaluation expression is also stored.

A processing device 20 is, for example, a CPU that executes various types of processing. The processing device includes the log acquisition unit 21 and an evaluation unit 22. The log acquisition unit 21 acquires a log for recording an access to the external DB 4. The evaluation unit 22 evaluates the performance impact by using an evaluation expression considering a software structure in addition to characteristics of data 2, based on the log acquired by the log acquisition unit 21. A single-portion evaluation unit 22A evaluates the single portion by using a single-portion evaluation expression 12A. A multi-portion evaluation unit 22B evaluates the multi-portion by using a multi-portion evaluation expression 12B. In a case where evaluation is performed in consideration of characteristics of data 2, such an evaluation unit is also stored.

"Software data/process separation" means separation of data 2 used by the processing server (application) 3 from a process P on the processing server 3 (see FIG. 2). The application 3 is software designed to achieve a particular purpose. The process P is a control logic for the application 3.

"The software data/process separation" may also be referred to as "separation of data 2 used in software into the external DB 4". The external DB 4 is a database on an external apparatus connected to the processing server 3 via a communication network, and is typically a cloud computer.

Operation

Figure 4:
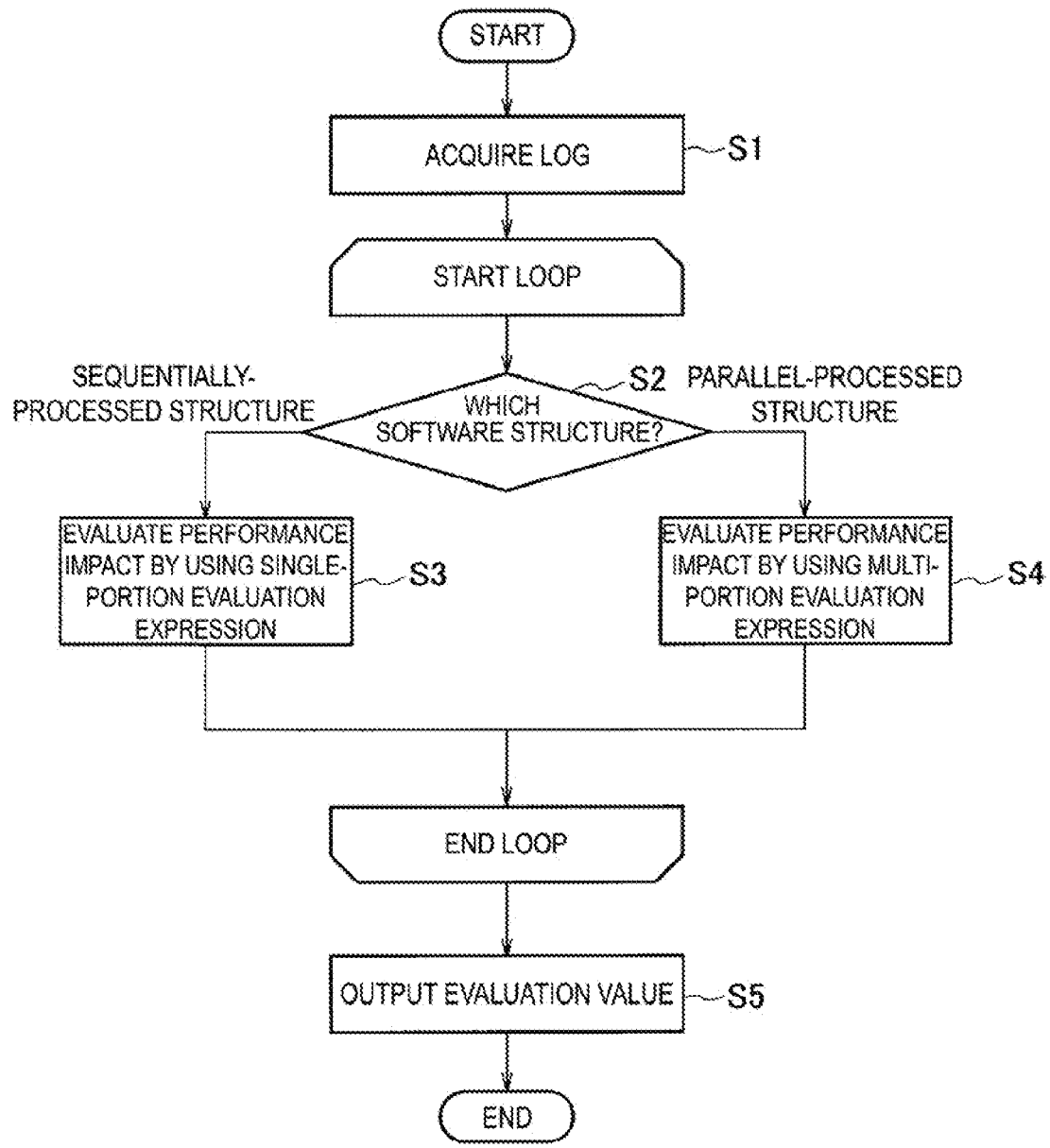
FIG. 4 is a flowchart illustrating an operation of the performance impact evaluation apparatus in the embodiment of the present disclosure.

FIG. 4 is a flowchart illustrating an operation of the performance impact evaluation apparatus 1 in the embodiment of the present disclosure. A configuration and an operation of the performance impact evaluation apparatus 1 will be described with reference to FIG. 4. Here, descriptions will be made focusing on evaluation of the performance impact considering the software structure, and detailed descriptions of evaluation of the performance impact considering characteristics of data 2 will be omitted.

Firstly, the log acquisition unit 21 acquires a log for recording an access to the external DB 4 (Step S1). For example, an access frequency per call and the size of each piece of data 2 are recorded in the log. In the following description, the size of data 2 may be simply referred to as "size".

The evaluation unit 22 determines whether a portion is a portion of the software structure that is a sequentially-processed structure or a portion of the software structure that is a parallel-processed structure (Step S2). Here, in a case where the portion is the portion of the software structure, which is a sequentially-processed structure, the single-portion evaluation unit 22A evaluates the single portion by using the single-portion evaluation expression 12A (Step S3). In a case where the portion is the portion of the software structure, which is processed in parallel, the multi-portion evaluation unit 22B evaluates the multi-portion by using the multi-portion evaluation expression 12B (Step S4).

The above processes are repeated for all portions of the software (Steps S2→S3→S2→ . . . , S2→S4→S2→ . . . ). Finally, an evaluation value is output (Step S5), and then the process is ended.

As a method of evaluating the performance impact considering the characteristics of data 2, a known method may be used. For example, as disclosed in Patent Literature 1, evaluation may be performed based on criteria as follows: (1) data accessed from a plurality of devices may be separated, and data accessed only from a particular device may not be separated; (2) In a case where an access is frequent or data capacity is large, the data may not be separated; (3) Data used in real-time response may not be separated; and (4) Data which is important and is designed with redundancy may be separated.

Thus, a user can obtain an index for dividing data into data to be separated and data not to be separated, based on the evaluation value output from the performance impact evaluation apparatus 1. In addition, it is possible to understand a separation effect when the application 3 is designed, by separating the data. As a result, it is possible to obtain an index indicating whether a data separation type system is employed, for example, the data separation type system is employed in a case where the separation effect is high, and the data separation type system is not employed in a case where the separation effect is low.

COMPARATIVE EXAMPLE

Next, a comparative example will be described. The comparative example corresponds to the technology disclosed in Patent Literature 1, but includes contents not disclosed in Patent Literature 1.

Figure 5:
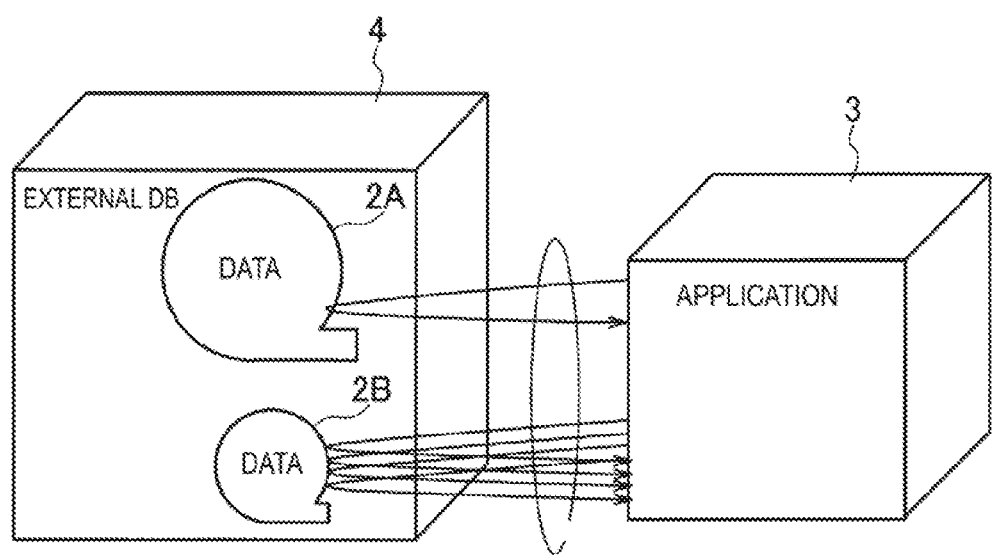
FIG. 5 is a conceptual diagram illustrating a comparative example.

In the comparative example, the degree of each characteristic is recognized based on the characteristics (size, access frequency, lifetime, or the like) of each piece of data 2, and the impact of data separation is evaluated from each degree. For example, as illustrated in FIG. 5, the impact of a difference in size between data 2A and data 2B, or the impact of the access frequency from the application 3 to the external DB 4 is evaluated. In addition, data is appropriately evaluated for each characteristic of a data operation such as a lifetime and a data type (state, configuration, or the like). In light of this method, the performance impact evaluation can be represented as "[delay]=[size evaluation]+[access frequency evaluation]+ . . . ". It is assumed that each characteristic affects the delay independently.

Problem 1 of Comparative Example

Next, Problem 1 of the comparative example will be described. When the comparative example is verified by verification, the characteristics affecting performance are the size and the access frequency. In the evaluation calculation, it is confirmed that the performance impact of the size is independent regardless of the access frequency, but the size affects the performance impact by the number of accesses. From this, it is understood that the size and the access frequency on the evaluation expression are dependent, not independent.

Figure 6C:
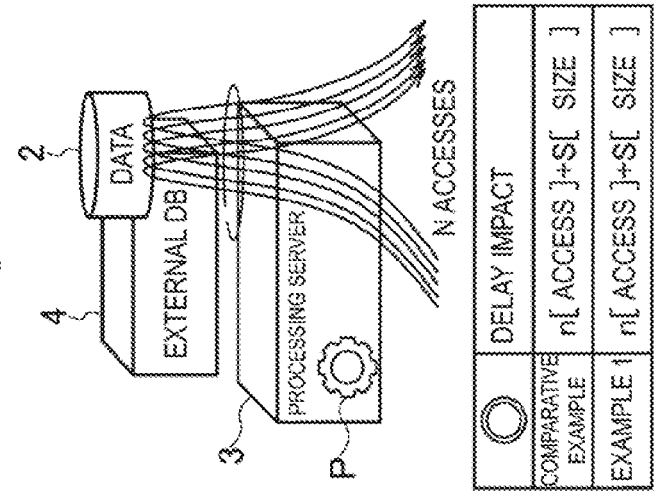
FIGS. 6A to 6C are conceptual diagrams illustrating Problem 1 of the comparative example.
Figure 6B:
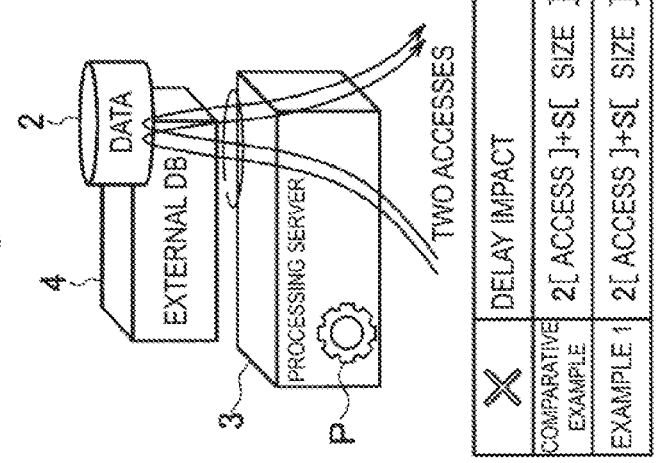
Figure 6A:
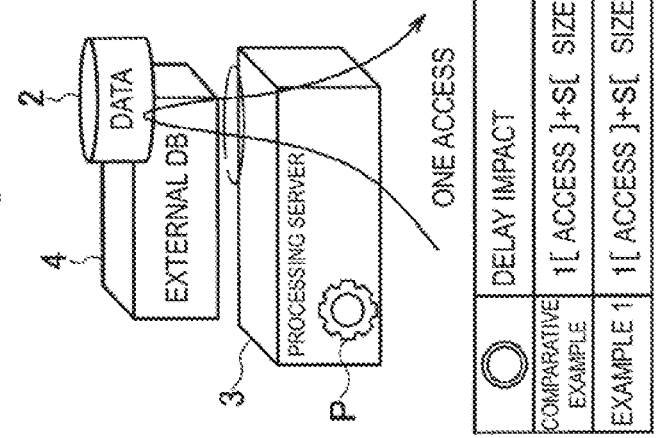

In the comparative example, evaluation can be performed only when the application 3 accesses the external DB 4 once, as illustrated in FIG. 6A. That is, in the comparative example, evaluation is not possible when two accesses are made from the application 3 to the external DB 4 as illustrated in FIG. 6B, or when an access from the application 3 to the external DB 4 is made n times (n is an integer of 3 or greater) as illustrated in FIG. 6C. In general, in a communication system in which a plurality of data accesses are assumed in a very short period, it is necessary to reflect the dependency between the access frequency and the size in the evaluation expression, in order to perform delay evaluation in data separation.

Example 1

Next, Example 1 will be described. Example 1 is an example of the embodiment of the present disclosure, and is for solving Problem 1 of the comparative example. As described above, because the size and the access frequency are dependent, an evaluation expression [Math 1] is used in Example 1.

Comparative Example Performance Impact∝Access frequency+Size

Example 1 Performance Impact∝Access frequency× Size     [Math 1]

The data access frequency increases or decreases in proportion to traffic. With the evaluation expression in which the dependency between the access frequency and the size is reflected, it is possible to perform evaluation in accordance with the traffic in a communication system as an evaluation target.

Problem 2 of Comparative Example

Figure 7A:
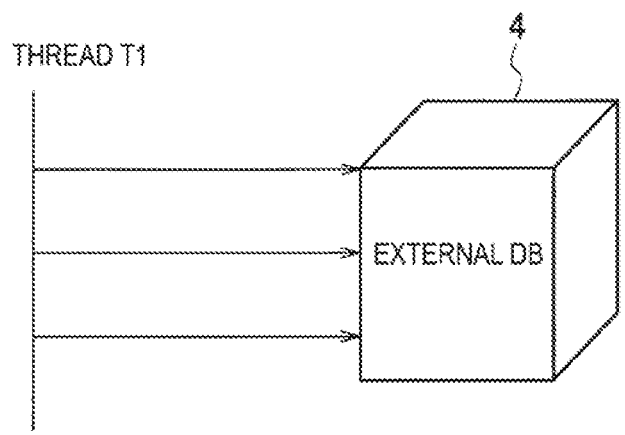
FIGS. 7A and 7B are conceptual diagrams illustrating Problem 2 of the comparative example.
Figure 7B:
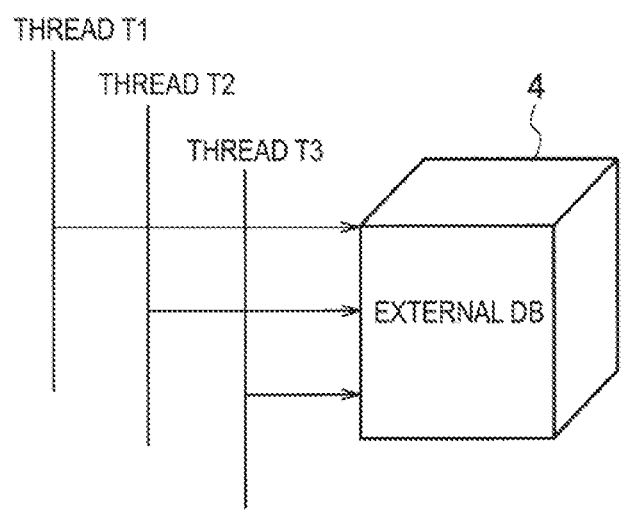

Although the evaluation expression is expressed by [Math 1] from a viewpoint closed to the characteristics of the data 2, the software structure (parallel processing) also affects the performance. That is, the performance impact is different for a sequentially-processed structure and a parallel-processed structure. For example, as illustrated in FIG. 7A, in the sequentially-processed structure, a thread T1 accesses the external DB 4 sequentially. Thus, the delay impact is multiplied by the number of accesses. As illustrated in FIG. 7B, in the parallel-processed structure, threads T1, T2, and T3 access the external DB 4 in parallel, and thus the delay impact is not accumulated. In the comparative example, such a performance impact evaluation considering the software structure is not possible.

Example 2

Next, Example 2 is described. Example 2 is an example of the embodiment of the present disclosure, and is for solving Problem 2 of the comparative example. In Example 2, in order to realize performance impact evaluation considering the software structure, the performance impact in the single portion and the multi-portion are as follows.

Figure 8:
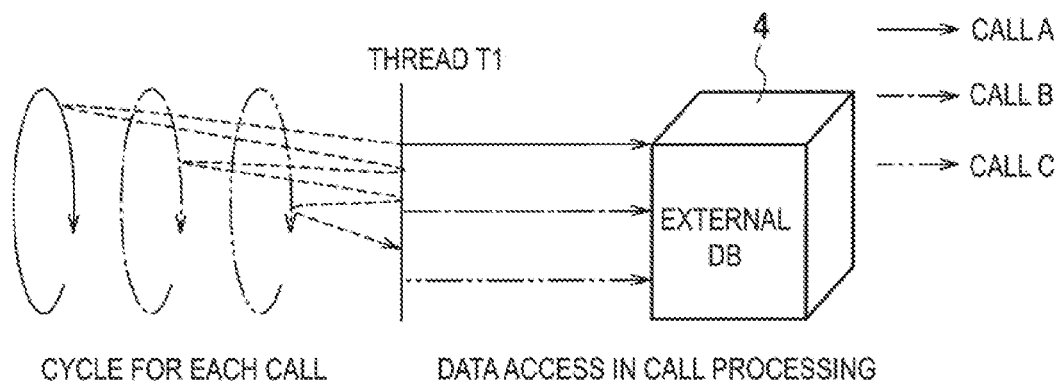
FIG. 8 is a conceptual diagram illustrating Example 2 (single portion).

Firstly, in a single portion, the performance impact is set to be multiplied by the number of accesses of all calls. Specifically, as illustrated in FIG. 8, it is assumed that there is the same processing cycle for each of calls A, B, and C, . . . , and the external DB 4 is accessed by processing for each of the calls A, B, and C, . . . . In this case, in the single portion, in the thread T1, after the data access of the preceding call (for example, call A, call B, . . . ), the data access of the subsequent call (for example, call B, call C, . . . ) is made. Thus, the access delay in each call is accumulated (waits). If the delay occurring during a period of a retransmission timer of the software is within a range of the timer value, the range is an allowable range (it is necessary that the delay impact is smaller than the period of the retransmission timer).

Figure 9:
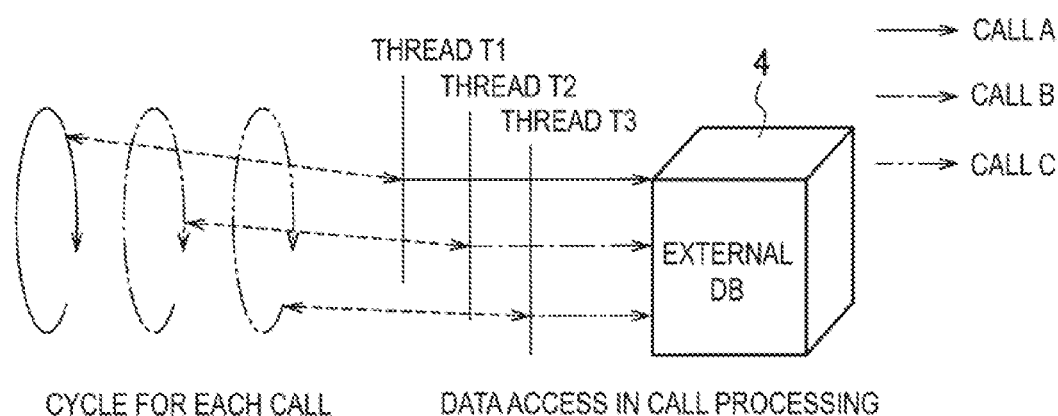
FIG. 9 is a conceptual diagram illustrating Example 2 (multi-portion).

In a multi-portion, the performance impact is set to be multiplied by the number of accesses of each call. Specifically, as illustrated in FIG. 9, it is assumed that there is the same processing cycle for each of calls A, B, and C, . . . , and the external DB 4 is accessed by processing for each of the calls A, B, and C, . . . . In this case, in the multiple-portion, the data access of each of the calls A, B, and C occurs individually in each of the threads T1, T2, and T3. Thus, the number of accesses occurring in each call affects each call.

The evaluation expression for each software structure will be specifically described below. Here, in order to clarify the characteristics of the evaluation expression in Example 2, description will be made in comparison with the evaluation expression in the comparative example.

Firstly, it is assumed that the evaluation expression in the comparative example is an evaluation expression of [Math 2]. The access frequency [times/second] indicates the access frequency from the application 3 to the external DB 4, and the size [Byte] indicates the size of data 2A or 2B to be accessed (see FIG. 5). The access frequency [times/second] can be referred to as the frequency [times/call]×the traffic [call/second], and the frequency [times/call] can be referred to as the number of accesses per call.

$$\text{Performance Impact} \propto \text{Access frequency[Times/Sec]} \times \text{Size[Byte]} \propto \text{Frequency[Times/Call]} \times \text{Traffic[Call/Sec]} \times \text{Size[Byte]} \qquad \text{[Math 2]}$$

On the contrary, in Example 2, as represented in [Math 3], in the single portion, the performance impact is multiplied by the number of accesses of all calls (see FIG. 8). The timer value [second] is the period of the retransmission timer of the software. The traffic [call/second]×the timer value [second] is used to determine how much the last signal is not be processed after processing is performed in the previous stage.

$$\text{Performance Impact} \propto \text{Frequency[Times/Call]} \times \text{Traffic[Call/Sec]} \times \text{Size[Byte]} \times \text{Timer value[Sec]} \qquad \text{[Math 3]}$$

In Example 2, as represented in [Math 4], in the multi-portion, the performance impact is multiplied by the number of accesses of one call (see FIG. 9). That is, because the data access individually occurs for each of the calls A, B, and C, the performance impact can be obtained by the number of accesses and the size per call. Thus, [Math 4] has a content in which "×traffic volume [call/sec]" is deleted from the evaluation expression of [Math 2].

$$\text{Performance Impact} \propto \text{Frequency[Times/Call]} \times \text{Size[Byte]} \qquad \text{[Math 4]}$$

Figure 10:
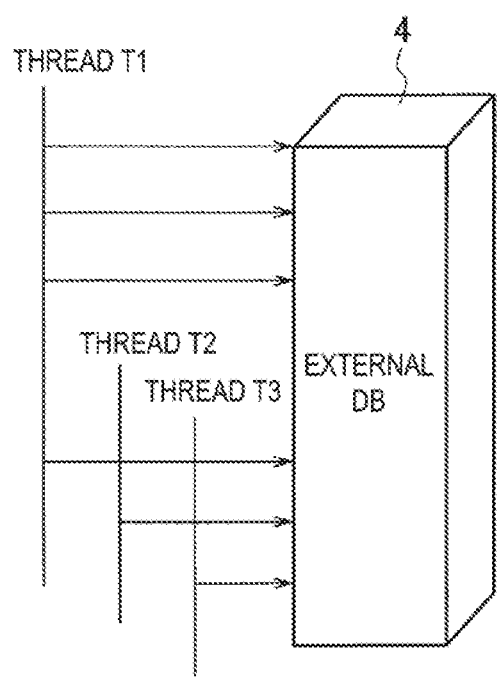
FIG. 10 is a conceptual diagram illustrating effects in Example 2.

As described above, according to Example 2, it is possible to evaluate the performance impact considering the software structure. In some cases, the evaluation considering only the characteristics of the data 2 does not match with the actual situation. However, it is possible to perform the evaluation more accurately by performing the evaluation considering the software structure. Specifically, as illustrated in FIG. 10, it is possible to perform the evaluation in a state where it is determined whether there is no problem in the sequentially-processed portion, and to perform the evaluation in a state where it is determined whether there is no problem in the parallel-processed portion.

CONCLUSION

As described above, the performance impact evaluation apparatus 1 according to the embodiment of the present disclosure is an apparatus that evaluates a performance impact caused by separating data 2 used in software into an external DB 4. The performance impact evaluation apparatus 1 includes a log acquisition unit 21 configured to acquire a log for recording an access to the external DB 4 and an evaluation unit 22 configured to evaluate the performance impact by using an evaluation expression considering a software structure in addition to characteristics of the data 2, based on the log acquired by the log acquisition unit 21. Thus, it is possible to provide the performance impact evaluation apparatus 1 in which it is possible to more accurately evaluate a performance impact caused by software data/process separation.

Specifically, the evaluation unit 22 may evaluate the performance impact by using an evaluation expression, and the evaluation expression for a portion of the software structure that is a sequentially-processed structure is different from the evaluation expression for a portion of the software structure that is a parallel-processed structure. This is because the performance impact is different for a sequentially-processed structure and a parallel-processed structure.

The evaluation unit 22 may evaluate the performance impact on the portion of the software structure, which is the sequentially-processed structure, by using an evaluation expression in which a delay impact is multiplied by the number of accesses. Thus, in a case of accessing the external DB 4 sequentially, it is possible to perform the evaluation suitable for the actual situation.

The evaluation unit 22 may evaluate the performance impact on the portion of the software structure, which is the sequentially-processed structure, by using the following evaluation expression. Thus, the performance impact can be set to be multiplied by the number of accesses of all calls.

$$\text{Performance Impact} \propto \text{Frequency[Times/Call]} \times \text{Traffic[Call/Sec]} \times \text{Size[Byte]} \times \text{Timer value[Sec]} \qquad \text{[Math 3]}$$

The evaluation unit 22 may evaluate the performance impact on the portion of the software structure, which is the parallel-processed structure, by using an evaluation expression in which a delay impact is not accumulated. As a result, evaluation in accordance with the actual conditions can be performed when accessing the external DB 4 in parallel.

In addition, the evaluation unit 22 may evaluate the performance impact by using the following evaluation expression for the portion of the structure in which the software structure is processed in parallel. Thus, the performance impact can be set to be multiplied by the number of accesses of one call.

$$\text{Performance Impact} \propto \text{Frequency[Times/Call]} \times \text{Size[Byte]} \qquad \text{[Math 4]}$$

The evaluation unit 22 may evaluate the performance impact by using an evaluation expression in which the size has an impact by the number of accesses to the external DB 4. Thus, it is possible to reflect the dependency between the access frequency and the size in the evaluation expression.

In the embodiment of the present disclosure, a performance impact evaluation method is a method for evaluating a performance impact caused by separating data 2 used in software into an external DB. In the performance impact evaluation method, the performance impact evaluation apparatus 1 acquires a log for recording an access to the external DB 4, and evaluates the performance impact by using an evaluation expression considering a software structure in addition to characteristics of data 2, based on the acquired log. Thus, it is possible to provide the performance impact evaluation method in which it is possible to more accurately evaluate a performance impact caused by software data/process separation.

OTHER EMBODIMENTS

As described above, the embodiment of the present disclosure has been described. However, it should not be understood that the description and drawings forming a portion of the present disclosure limit the present disclosure. Various alternative embodiments, examples, and operational techniques will be apparent to those skilled in the art from this disclosure.

For example, the performance impact evaluation apparatus 1 in the embodiment of the present disclosure may be configured on one piece of hardware as illustrated in FIG. 3, or may be configured on plural pieces of hardware in accordance with the functions or the number of processes. The performance impact evaluation apparatus 1 may be implemented on a known information processing system.

In addition, the technology disclosed in Patent Literature 1 may be employed in the performance impact evaluation apparatus 1 in the embodiment of the present disclosure. For example, a score can be generated, and a performance impact can be evaluated, by a similar technology to that disclosed in Patent Literature 1.

The present disclosure includes various embodiments and the like not described herein. Thus, the technical scope of the present disclosure is defined only by the present disclosure specifying matters according to the claims that are appropriate from the above description.

REFERENCE SIGNS LIST

1 Performance impact evaluation apparatus
2 Data
3 Processing server (application)
4 External DB
10 Storage device
11 Log storage unit
12 Evaluation expression storage unit
20 Processing device
21 Log acquisition unit
22 Evaluation unit

The invention claimed is:

1. A performance impact evaluation apparatus that evaluates a performance impact caused by separating data used in software into an external database (DB), the apparatus comprising:
a log acquisition unit configured to acquire a log for recording an access to the external DB; and
an evaluation unit configured to evaluate the performance impact by using an evaluation expression considering a software structure in addition to characteristics of data, based on the log acquired by the log acquisition unit,
wherein the evaluation unit evaluates the performance impact by using an evaluation expression that is different for each of (i) a portion of the software structure that is a sequentially-processed structure and (ii) a portion of the software structure that is a parallel-processed structure.

2. The performance impact evaluation apparatus according to claim 1, wherein:
the evaluation unit evaluates the performance impact on the portion of the software structure that is the sequentially-processed structure by using an evaluation expression in which a delay impact is multiplied by a number of accesses.

3. The performance impact evaluation apparatus according to claim 2, wherein:
the evaluation unit evaluates the performance impact on the portion of the software structure that is the sequentially-processed structure by using the following evaluation expression:

$$\text{Performance Impact} \propto \text{Frequency[Times/Call]} \times \text{Traffic[Call/Sec]} \times \text{Size[Byte]} \times \text{Timer value[Sec]}.$$

4. The performance impact evaluation apparatus according to claim 1, wherein:
the evaluation unit evaluates the performance impact on the portion of the software structure that is the parallel-processed structure by using an evaluation expression in which a delay impact is not accumulated.

5. The performance impact evaluation apparatus according to claim 4, wherein:
the evaluation unit evaluates the performance impact on the portion of the software structure that is the parallel-processed structure by using the following evaluation expression:

$$\text{Performance Impact} \propto \text{Frequency[Times/Call]} \times \text{Size[Byte]}.$$

6. A performance impact evaluation apparatus that evaluates a performance impact caused by separating data used in software into an external database (DB), the apparatus comprising:
a log acquisition unit configured to acquire a log for recording an access to the external DB; and
an evaluation unit configured to evaluate the performance impact by using an evaluation expression considering a software structure in addition to characteristics of data, based on the log acquired by the log acquisition unit,
wherein the evaluation unit evaluates the performance impact by using an evaluation expression in which a size of accessed data has an impact by a number of accesses to the external DB.

7. A performance impact evaluation method for evaluating a performance impact caused by separating data used in software into an external database (DB), the method comprising:
at a performance impact evaluation apparatus, acquiring a log for recording an access to the external DB; and
evaluating the performance impact by using an evaluation expression that is different for a portion of the software structure that is a sequentially-processed structure and a portion of the software structure that is a parallel-processed structure, based on the log acquired in the acquiring.

* * * * *